(12) United States Patent
Van Duyn

(10) Patent No.: US 7,018,078 B2
(45) Date of Patent: Mar. 28, 2006

(54) LIGHT ASSEMBLY WITH BENDING LIGHT

(75) Inventor: Paul D. Van Duyn, Anderson, IN (US)

(73) Assignee: Guide Corporation, Pendleton, IN (US)

( * ) Notice: Subject to any disclaimer, the term of this patent is extended or adjusted under 35 U.S.C. 154(b) by 157 days.

(21) Appl. No.: 10/652,940

(22) Filed: Aug. 29, 2003

(65) Prior Publication Data
US 2005/0047151 A1    Mar. 3, 2005

(51) Int. Cl.
*B60Q 1/06* (2006.01)
*F21V 17/02* (2006.01)

(52) U.S. Cl. .............. 362/464; 362/284; 362/324; 362/512

(58) Field of Classification Search ........ 362/282–284, 362/322–324, 512, 513, 464–466
See application file for complete search history.

(56) References Cited

U.S. PATENT DOCUMENTS

| | | | |
|---|---|---|---|
| 1,834,542 A | | 12/1931 | Karlebo |
| 4,908,560 A | * | 3/1990 | Shibata et al. ............ 362/465 |
| 4,987,521 A | | 1/1991 | Fratty et al. |
| 5,379,196 A | * | 1/1995 | Kobayashi et al. ........ 362/466 |
| 5,645,338 A | * | 7/1997 | Kobayashi ................ 362/466 |
| 5,660,454 A | * | 8/1997 | Mori et al. ................ 362/466 |
| 6,190,029 B1 | | 2/2001 | Taniuchi et al. |
| 6,286,985 B1 | | 9/2001 | Ohshio et al. |
| 6,354,721 B1 | | 3/2002 | Zattoni |
| 6,402,355 B1 | | 6/2002 | Kinouchi |
| 6,425,683 B1 | | 7/2002 | Kusagaya et al. |
| 6,428,195 B1 | | 8/2002 | Ohshio et al. |
| 6,443,606 B1 | | 9/2002 | Mochizuki |
| 6,447,153 B1 | | 9/2002 | Kawamura |
| 6,550,944 B1 | * | 4/2003 | Kusagaya ................ 362/466 |
| 6,663,270 B1 | * | 12/2003 | Taniuchi et al. ........... 362/512 |
| 2001/0002879 A1 | | 6/2001 | Suzuki |
| 2001/0010634 A1 | | 8/2001 | Yokoi |
| 2002/0051365 A1 | | 5/2002 | Yokoi |
| 2002/0067619 A1 | | 6/2002 | Ikeda et al. |
| 2002/0071286 A1 | | 6/2002 | Taniuchi |

FOREIGN PATENT DOCUMENTS

DE    010059677 A1    6/2002
JP    411339536 A    12/1999

* cited by examiner

*Primary Examiner*—Alan Cariaso
(74) *Attorney, Agent, or Firm*—Ice Miller LLP

(57) ABSTRACT

The present invention comprises a light assembly which provides additional light adjacent the main beam of a light. A shield within the light assembly is moved in response to a sensed condition so as to provide a first area of additional illumination at the edge of the light's main beam. In response to a second sensed condition, the shield is moved such that a second area of additional illumination is illuminated in addition to the first area.

21 Claims, 12 Drawing Sheets

LIGHT ASSEMBLY WITH BENDING LIGHT

BACKGROUND

In response to changing driving conditions, it can become desirable to adjust the beam pattern of a headlamp assembly relative to the vehicle. For example, when a vehicle is being driven around a corner, it may be desirable for the beam pattern of that vehicle's forward lighting system to be adjusted, axially and/or laterally, such that the emitted light better illuminates the area in the direction the vehicle is turning. Automotive headlamps that can be adjusted in this manner are generally known in the industry as adaptive front lighting systems ("AFS"). AFS lighting systems can be very expensive, because of the control systems needed to move the light beam.

In certain applications, rather than moving the light beam pattern, the vehicle lighting industry has developed static supplemental lighting fixtures which are aimed so as to illuminate the general direction in which a vehicle is being turned. The vehicle lighting industry refers to lighting used to illuminate the path of a vehicle while the vehicle is turning as "bending light." Static supplemental lighting fixtures which are used to provide bending light are controlled on and off by means generally known in the art. These systems, while less expensive than AFS systems, have certain limitations. For example, some turns are more severe than other turns, yet the static supplemental lighting fixtures cannot be adjusted to better illuminate the path of the vehicle.

Therefore, it is desirable in an automotive lighting system to provide a bending lamp that allows for significant angular displacement of the light beam of a headlamp assembly without excessive light beam distortion and without the need to move the entire headlamp assembly. It is further desired that the system be of inexpensive and dependable construction, while providing for increased scope of illumination as the severity of the turn is increased. It is further desired that the headlamp assembly be easily configured to fit within space confines of a variety of vehicle designs.

BRIEF SUMMARY OF THE INVENTION

In accordance with the present invention, additional illumination is provided to an area adjacent the normal illumination area of a light assembly under certain conditions. For example, when the invention is incorporated into a headlamp and a vehicle is turning to the right, the area of illumination is spread horizontally to the right, thus providing additional illumination in the direction of the turn.

According to one embodiment, the central portion of a light assembly reflector is utilized for forming the normal illumination area of the light assembly. The outer portions of the reflector are designed to direct light adjacent to the normal illumination area. These outer portions may be designed to direct light at ever increasing spread angles as progression is made from the area adjacent to the central portion of the reflector outward. The present invention may be designed to allow an additional 15–20 degrees of illumination in the horizontal plane to the right and to the left of the normal illumination area in response to a sensed condition.

Illumination of the outer portion of the reflector may be accomplished by movement of shields near the source light. In one embodiment, there are two movable light source shields, each shield operatively positioned in opposition to each other adjacent a light source. Thus, as a condition is sensed wherein it is desired to illuminate an additional area, the appropriate shield is moved so as to allow some or all of the outer portion of a reflector to be illuminated, thus creating an additional area of illumination.

DETAILED DESCRIPTION OF THE INVENTION

Figure 1:
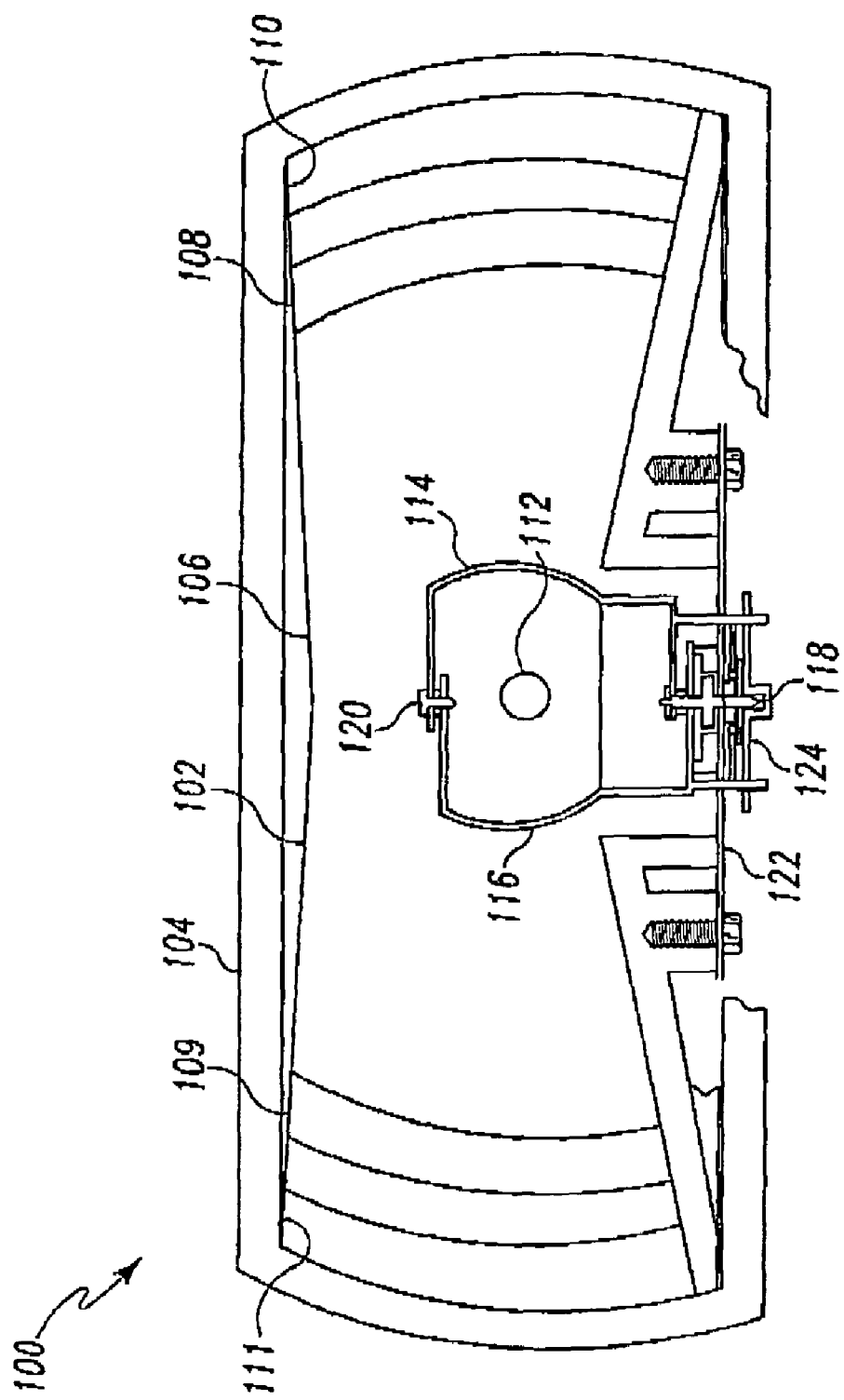
FIG. 1 is a partial cutaway front view of a headlamp assembly showing a first embodiment of shields in accordance with the present invention.
Figure 2:
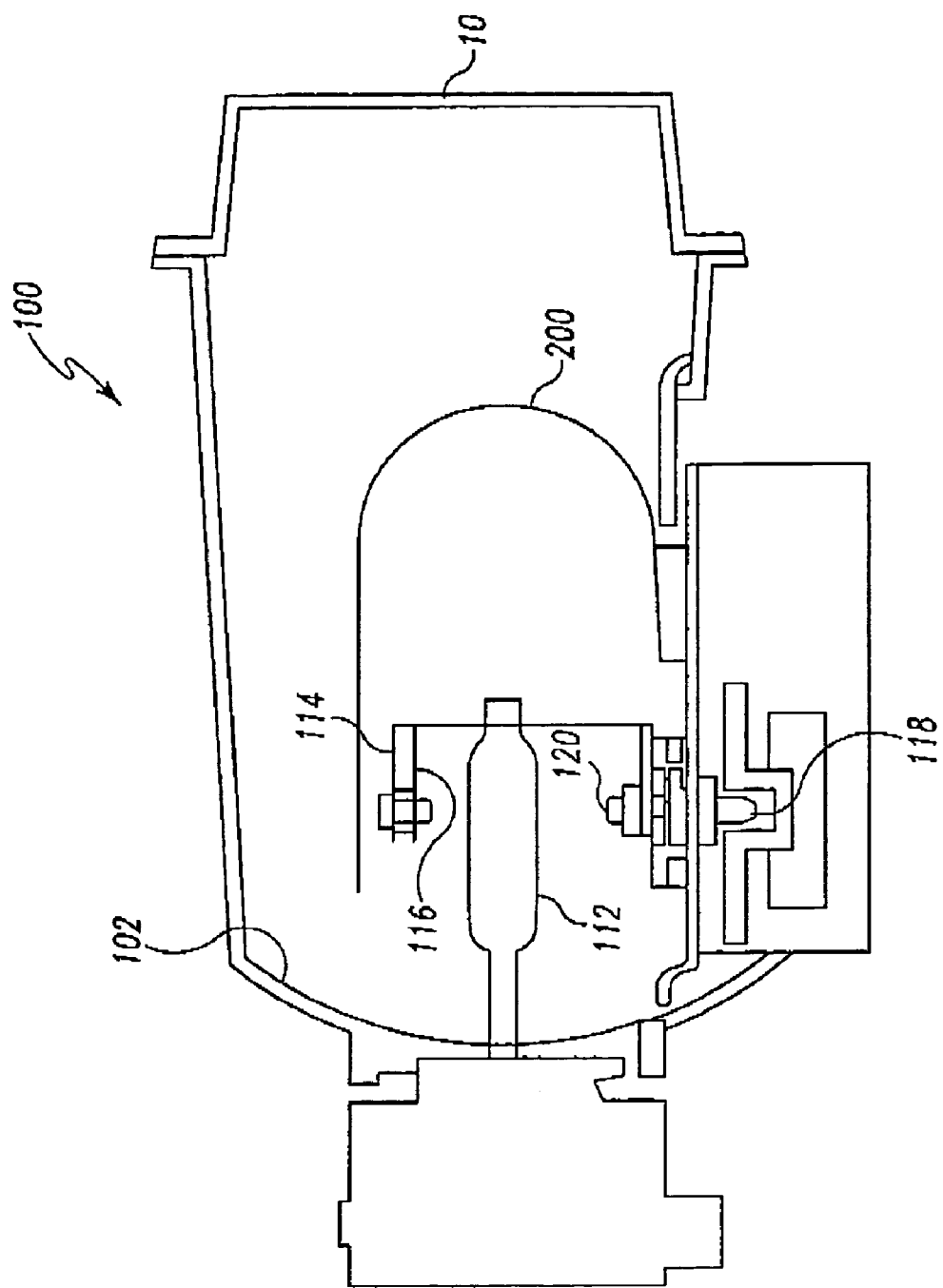
FIG. 2 is a partial cutaway side view of the headlamp assembly of FIG. 1.

Referring to FIG. 1, one embodiment of the present invention is described. Light assembly 100 includes reflector 102 formed on the innermost surface of housing 104. Central portion 106 of the reflector provides for a normal function such as the low beam in a vehicle headlamp assembly. Outer portions 108 and 109 of reflector 102 are located adjacent central portion 106 and are designed to direct (reflect) light at ever increasing horizontal spread angles as progression occurs from an area adjacent to central portion 106 to the outer edges 110 and 111 of outer zones 108 and 109 respectively. Light source 112 is visible in FIG. 1 as static shield 200 (see FIG. 2) has been removed for clarity of the figure.

Figure 3:
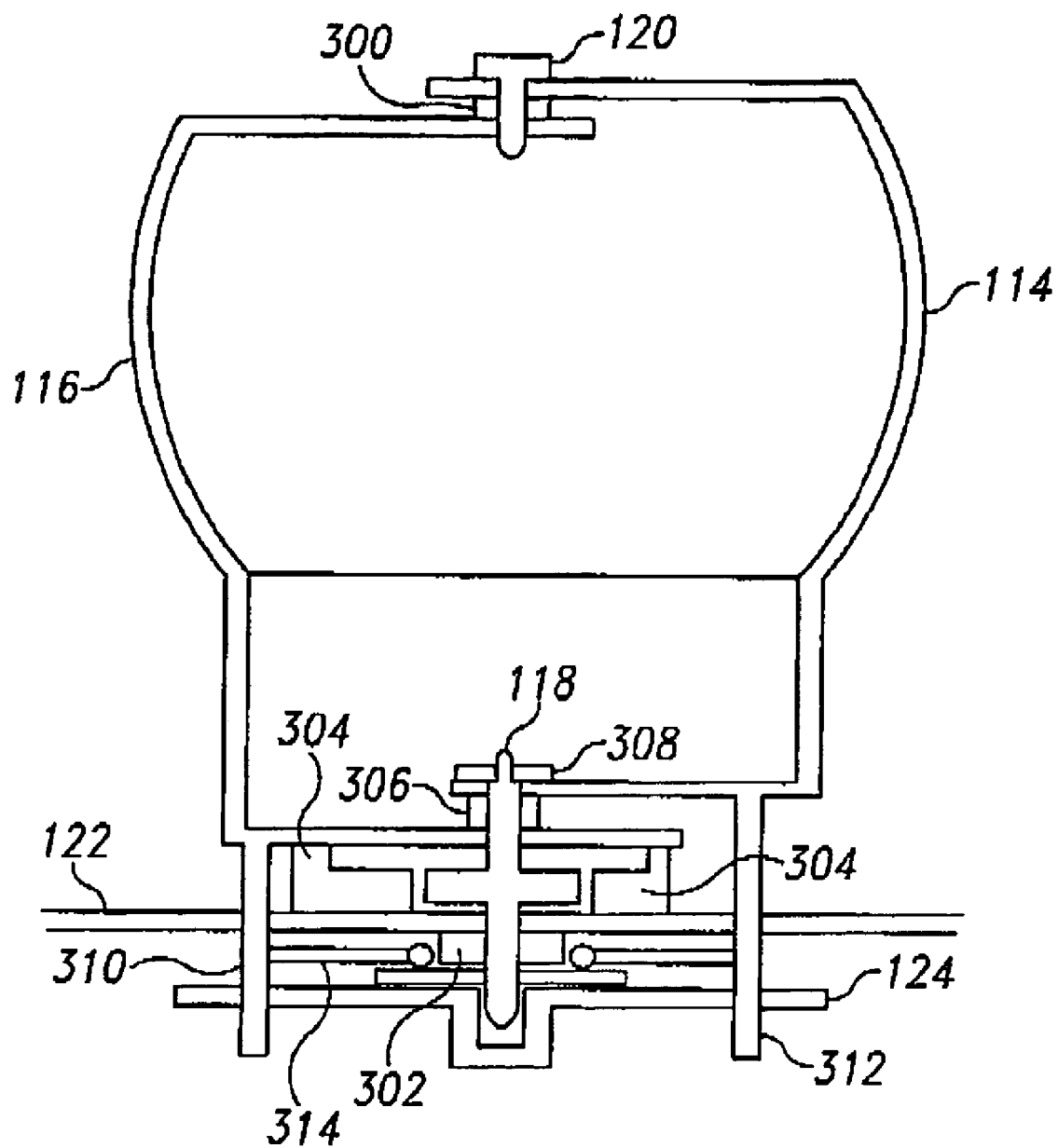
FIG. 3 is a partial cutaway front view of a shield assembly of FIG. 1.

The embodiment of FIG. 1 includes movable shield 114 and movable shield 116. Shield 114 is positioned along one side of light source 112 and shield 116 is positioned generally on the opposite side of light source 112. The pivot axis of moveable shields 114 and 116 is determined by shouldered pivot stud 118 and pivot pin 120 shown more clearly in FIG. 3. Shields 114 and 116 have centering holes to properly align them around shouldered pivot stud 118 and pivot pin 120. The hole at the upper portion of shield 114 may be a tapped hole such that a threaded pivot pin may be secured therein. Washer 300 is trapped between shields 114 and 116 to ensure proper shield separation and to reduce potential friction during independent shield rotation.

Shouldered pivot stud 118 is secured to attachment plate 122 by lower nut 302. Stabilizer bearing 304 is located about shouldered pivot stud 118. Shield 116 is centered over shouldered pivot stud 118 and bears against stabilizer bearing 304. Spring washer 306 is placed on shouldered pivot stud 118. Upper nut 308 is assembled onto and secured against the shoulder portion of shouldered pivot stud 118. The length of the shoulder portion of shouldered pivot stud 118 provides the required space for proper tensioning of spring washer 306. The foot print of stabilizer bearing 304 is large to assure vertical alignment and stability to shield 116. Stability for shield 114 is provided by rotationally connecting shield 114 to shield 116 at shouldered pivot stud 118 and pivot pin 120.

Shield 116 comprises shield pin 310 and shield 114 comprises shield pin 312. These pins are integral with and formed from the respective shield. Alternatively, the shield pins may be separate pieces which are secured to the shield. The shield pins pass through attachment plate 122 and into the slots in shield drive disc 124.

Figure 4A:
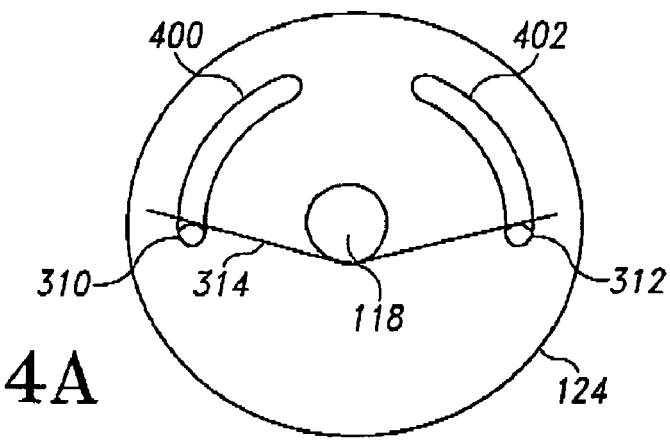
FIG. 4A is a bottom plan view of the shield drive disc in a neutral position.

In this embodiment, tension spring 314 is placed over shouldered pivot stud 118 as shown more clearly in FIGS. 4A, B and C. The ends of tension spring 314 contact shield pins 310 and 312 forcing them respectively toward the rear edge of slots 400 and 402 of shield drive disc 124 when shield disc drive 124 is in its neutral position as shown in FIG. 4A. It is desirable to have tension spring 314 force the shield pins into contact with a mechanical stop when the shields are in a neutral position. Thus, when shield drive disc 124 is rotated in the direction of arrow B in FIG. 4B, shield pin 312 is moved by shield drive disc 124. Shield pin 310, however, remains static against mechanical stop 404 and is not influenced to rotate due to the elongated clearance provided by slot 400.

Figure 4B:
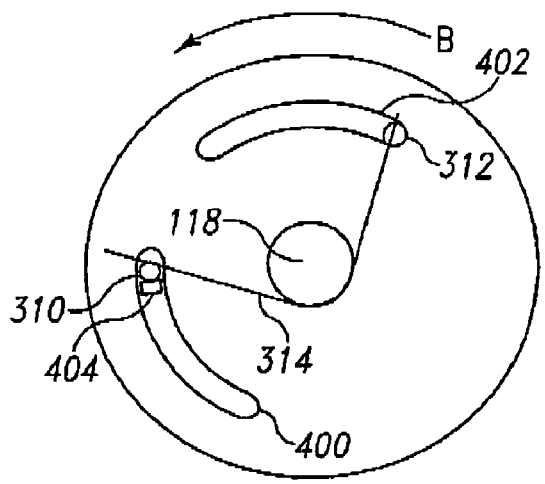
FIG. 4B is a bottom plan view of a the shield drive disc of FIG. 4A in a rotated position.
Figure 4C:
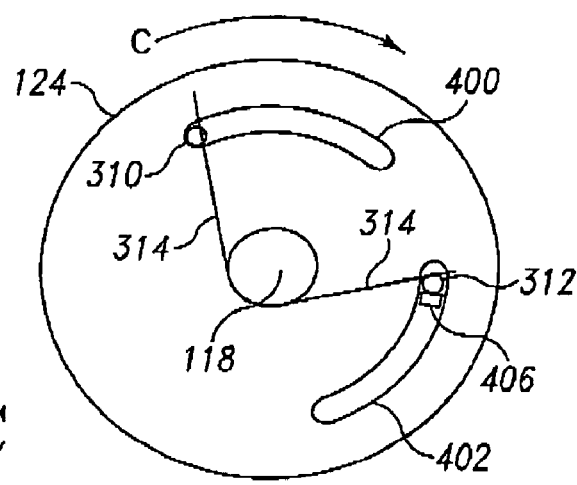
FIG. 4C is a bottom plan view of a the shield drive disc of FIG. 4A in a rotated position.

FIG. 4C shows shield drive disc 124 rotated in the direction of arrow C from its neutral position. When drive disc 124 is rotated in the direction of arrow C, shield pin 310 is moved by shield drive disk 124 in the direction of arrow C. Shield pin 312, however, remains static against mechanical stop 406 and is not influenced to rotate due to the elongated clearance provided by slot 402. Tension spring 314 thus serves the primary function of preventing potential shield/beam flutter by biasing the shield pins against the mechanical stop thus dampening vibration. The spring could also be utilized for default mechanical return to "home" (neutral) in the event of an actuator failure.

An actuator is used in combination with shield drive disc 124 to rotate shields 114 and 116. In this embodiment, shields 114 and 116 are rotated individually and not simultaneously. Of course, a number of alternative designs are possible. For example, more than one actuator may be used and/or it may be desired to have both shields actuated at the same time for sensed conditions such as increased speed. Alternatively, it may be desired to activate only the headlamp assembly associated with the direction of the turn. Thus, when making a left turn, the left headlamp assembly's drive disc would be activated, moving either one or both shields. These alternative embodiments and others being within the scope of the present invention.

Figure 5:
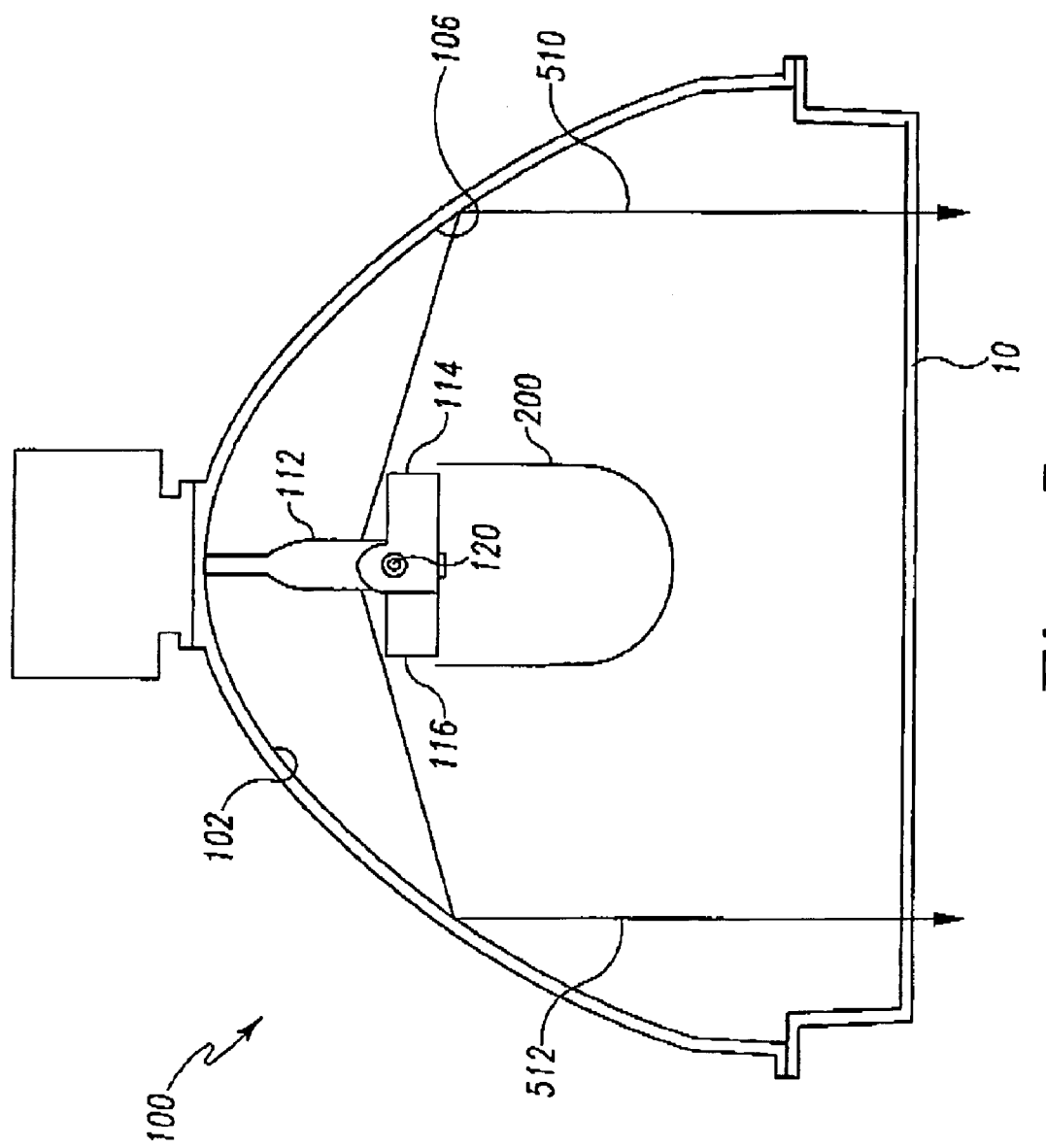
FIG. 5 is a partial cutaway top view of the headlamp assembly of FIG. 1.

Operation of the shields in the embodiment of FIG. 1 is explained with reference to FIGS. 4-8. Initially, shield disc drive 124 is in its neutral position as shown in FIG. 4A. Accordingly, shields 114 and 116 are positioned as shown in FIG. 5. In this position, only inner portion 106 of reflector 102 is in optical communication with light source 112. Thus, light rays 510 and 512 show exemplary light rays formed by light source 112 and reflected off inner portion 106 of reflector 102. As is well known in the art, the beam pattern effected by light assembly 100 is the result of the prescription of the reflector or the prescription of the reflector and the lens.

Figure 6:
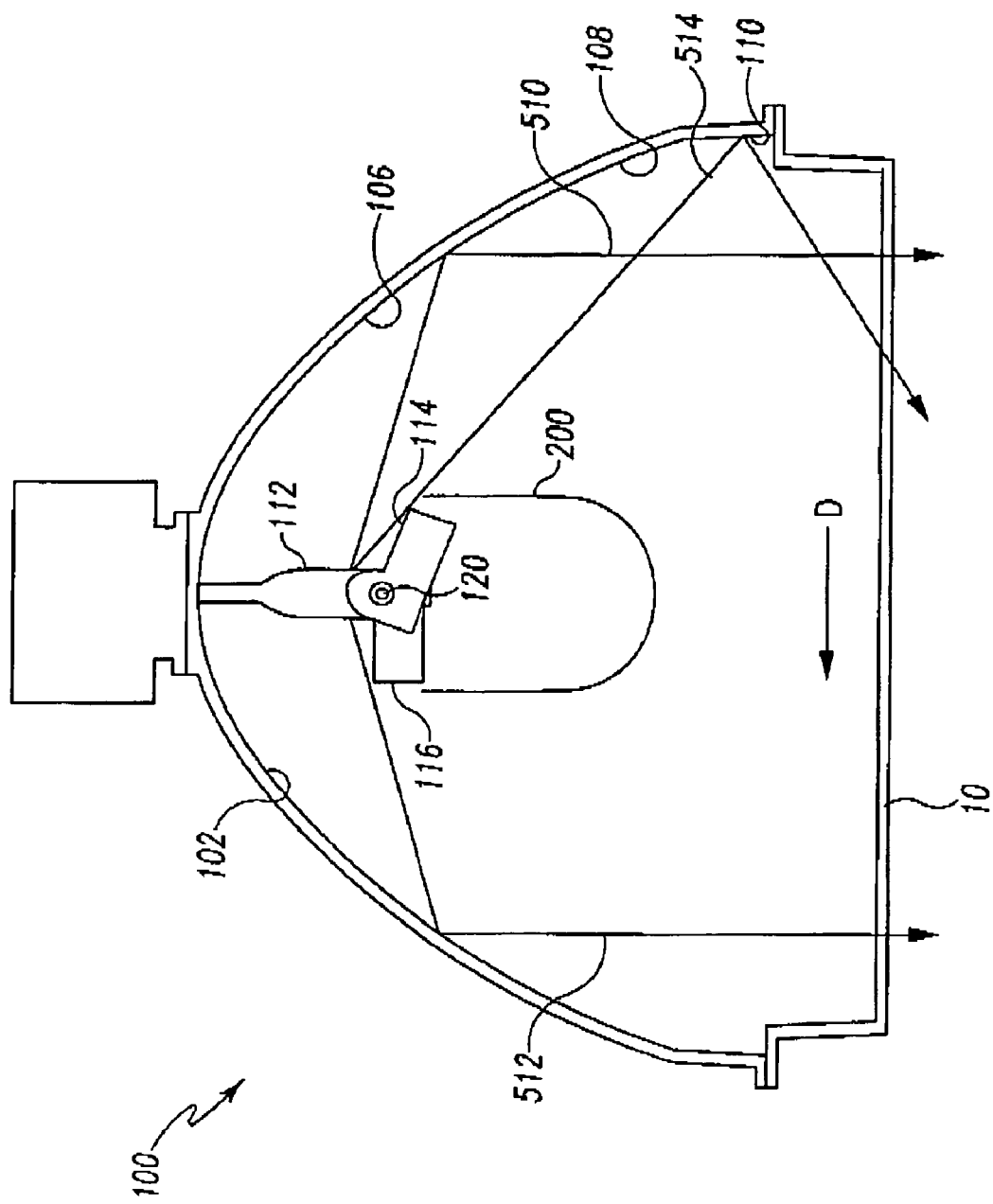
FIG. 6 is a partial cutaway top view of a headlamp assembly of FIG. 1.

FIG. 4B shows shield drive disc 124 fully rotated in the direction of arrow B in response to a sensed condition, such as a right hand turn (the direction of arrow D of FIG. 6). Accordingly, shield pin 312 is moved in the direction of arrow B, causing shield 114 to rotate from the neutral position to the position shown in FIG. 6. This allows reflector 102 to be illuminated to outer edge 110 of outer zone 108 as shown by light ray 514. Therefore, bending light will be spread in the direction of arrow D of FIG. 6.

Figure 7:
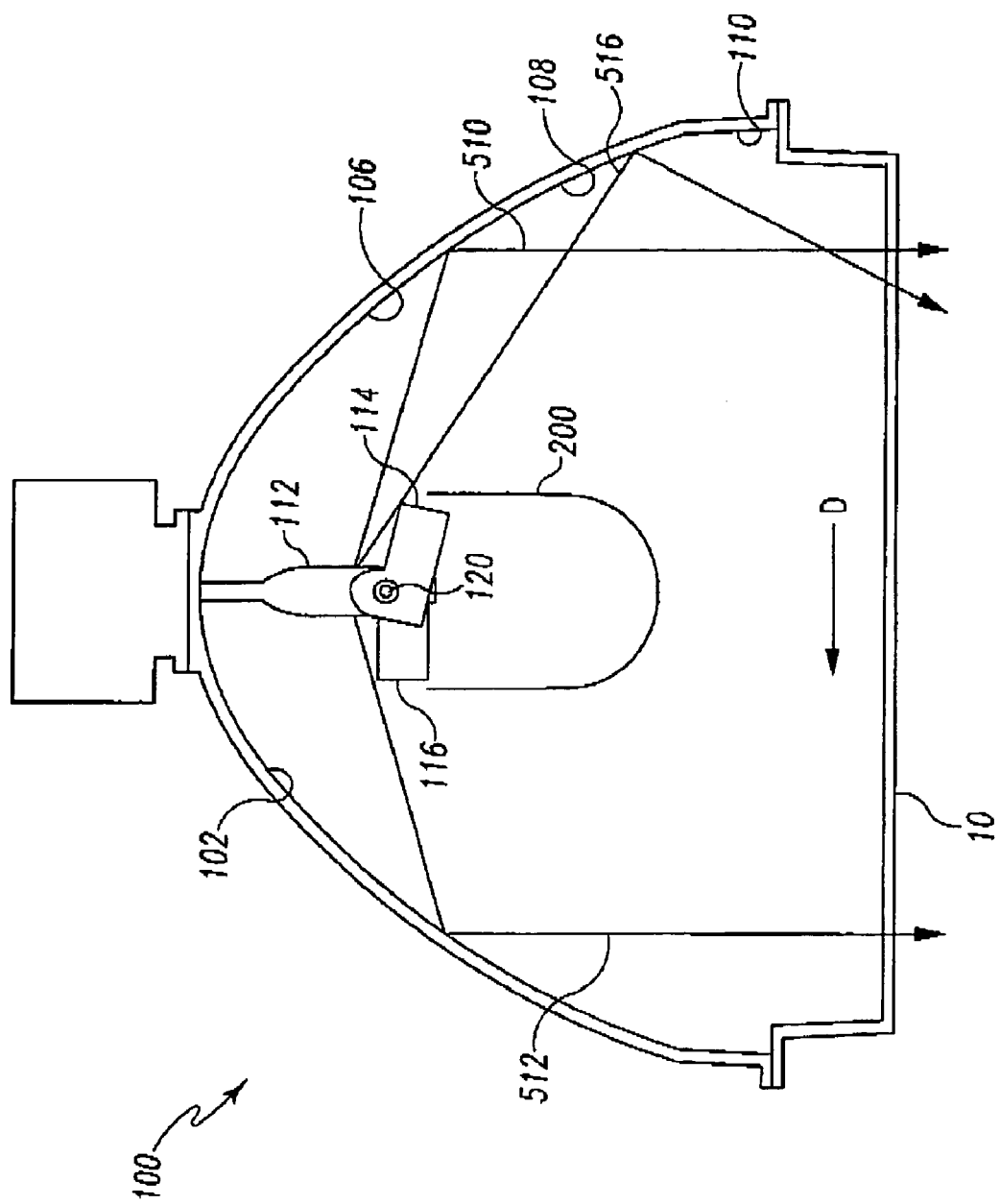
FIG. 7 is a partial cutaway top view of a headlamp assembly of FIG. 1.
Figure 8:
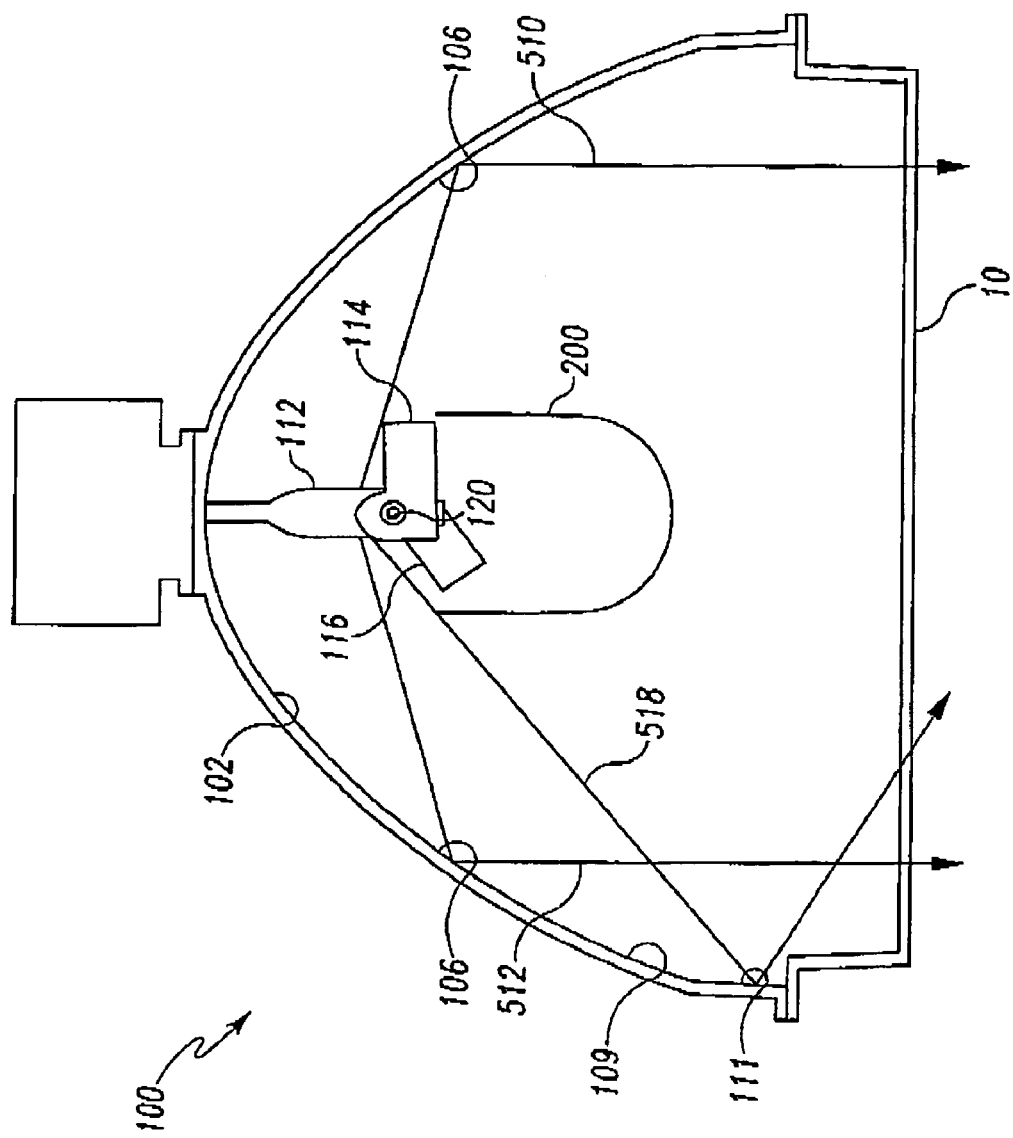
FIG. 8 is a partial cutaway top view of a headlamp assembly.

Referring now to FIG. 7, shield 114 is shown in a position intermediate its neutral position and the position shown in FIG. 5. In this position, only a portion of outer zone 108 is illuminated as shown by light ray 516. Of course shield 116 may be moved in similar fashion. For example, FIG. 8 shows shield 116 rotated so as to expose outer edge 111 of outer zone 109 so that it is illuminated by light ray 518.

Accordingly, it is possible to place shield 114 and/or shield 116 in multiple positions in order to selectively add areas of illumination beyond the beam pattern produced when the shields are in the neutral position. This allows a designer to move a shield to a first position in response to a first sensed condition, and to a second position in response to a second sensed condition. In operation, the need for bending light is sensed according to means well known in the art. Those of skill in the art will understand that the sensed condition does not require movement of a vehicle. For example, a sensed turning condition for moving shield 114 to the position shown in FIG. 7 may be determined solely upon the position of wheels of a vehicle, a turn signal switch, speed, or some combination of the foregoing. Additionally, even when the wheels are in a generally forward configuration, it may be desired to provide additional lighting as the speed of the vehicle increases. In yet another example, vehicle speed is combined with other input, such as wheel position to provide a sensed turn condition. Thus, at a lower speed, a slight turn will not result in shield 114 being moved, while the same turn at a higher speed results in shield 114 being moved. These and other variations are within the scope of the present invention.

The above described embodiment works well with light assemblies that are relatively short and wide. However, as the height to width ratio increases, it may be more desirable to use axial shields (shields having an edge parallel to the length of the filament of the light source). For example, when using a "real world" light source, as opposed to a theoretical point source of light, in conjunction with a shield, an area of penumbra is created.

The penumbra results from the fact that the shield cannot limit the reflector to just being exposed to either full illumination from the light source or no illumination from the light source. Rather, because of the non-point source dimensions of the light source, there is necessarily an area of the reflector which is partially exposed to the light source, some light rays being blocked while others are not.

Because adequacy of a light assembly is determined by the intensity of the light in a desired area, a large area of penumbra is typically not desired. This is because the light intensity within the penumbra is not consistent, varying from nearly full intensity to nearly no light intensity. Design of a light assembly to achieve the desired intensity within the penumbral area, would necessarily mean that there is more intensity in the fully illuminated area than is needed. This wastes power, requiring higher power light sources. Moreover, a sharp cutoff between the illuminated area and the non illuminated area is a desired aesthetic in many applications. Accordingly, it can be preferable to align, to the extent possible, the movable edge of the shield along the longitudinal axis of the light source. An embodiment with this configuration is described with reference to FIGS. 9–11.

Figure 9:
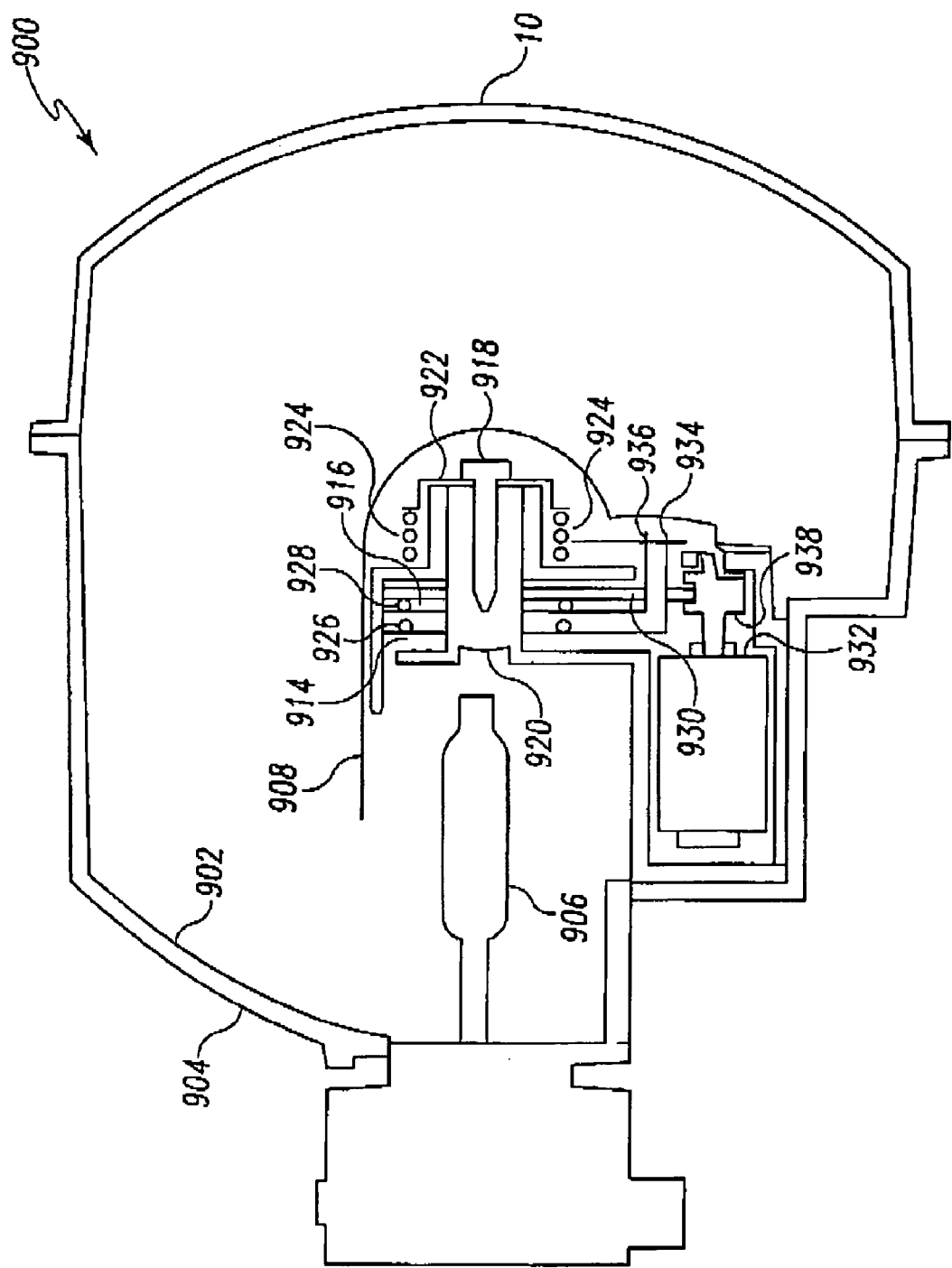
FIG. 9 is a partial cutaway side view of an alternative embodiment of a headlamp assembly according to the present invention.
Figure 10:
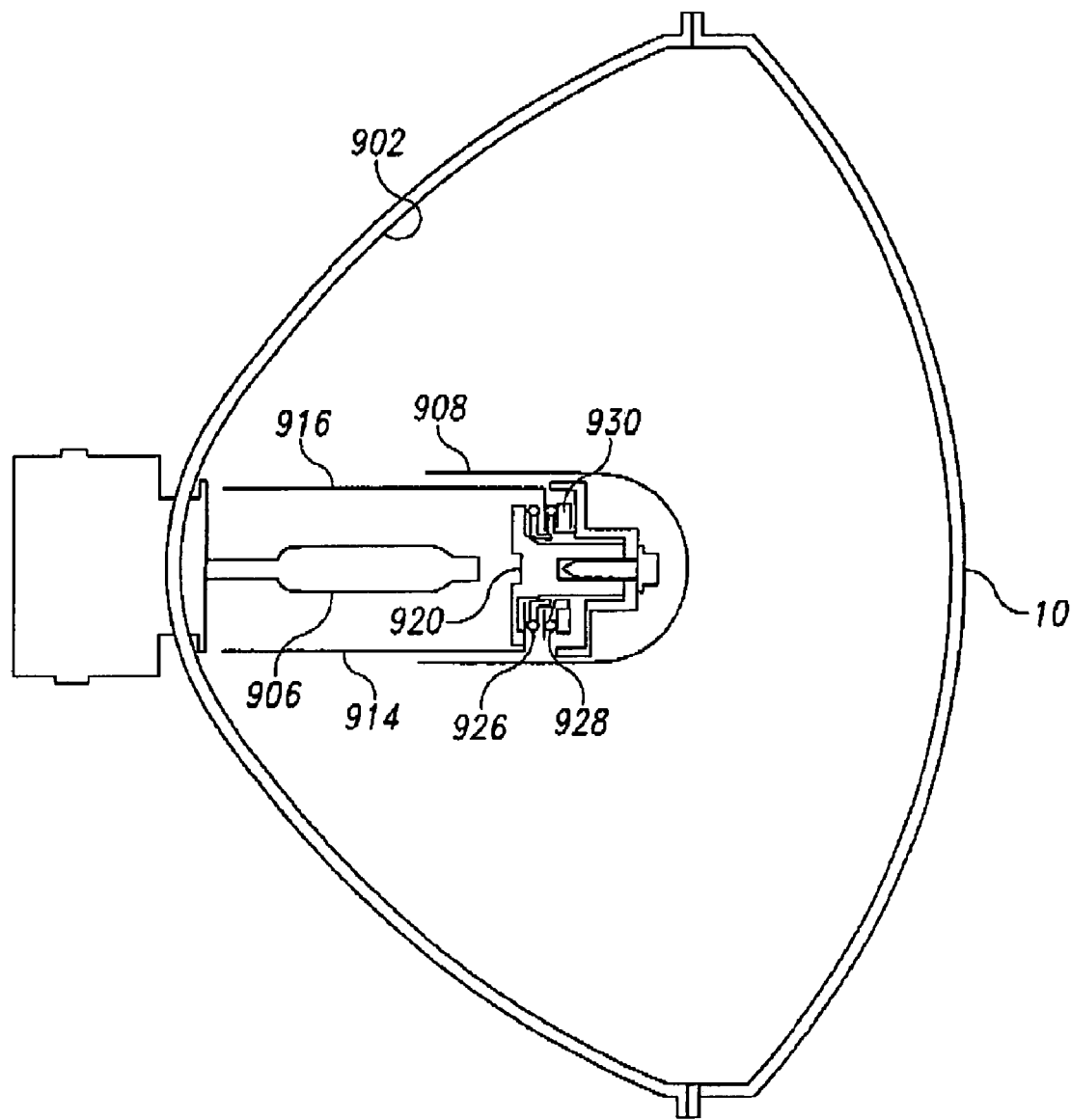
FIG. 10 is a partial cutaway top view of the headlamp assembly of FIG. 9.

Referring to FIG. 9, a partial cutaway side view of an alternative embodiment of the present invention is shown. Light assembly 900 includes reflector 902 formed on the innermost surface of housing 904, light source 906 and static shield 908. The embodiment of FIG. 9 includes movable shield 914 and movable shield 916. As is shown more clearly in FIG. 10, shield 914 is positioned along one side of light source 906 and shield 916 is positioned generally on the opposite side of light source 906. The pivot axis of moveable shields 914 and 916 is determined by base 920. Shields 914 and 916 have centering holes to properly align them around base 920. Shield 914 comprises shield pin 934 which protrudes through shield disc drive 930 and shield 916 comprises shield pin 936 which protrudes through shield disc drive 930, as discussed more fully below.

Pivot stud 918 forces washer 922 against spring 924. Bearings 926 and 928 prevent torque from passing directly between shield 914 and shield 916 and shield 916 and shield disc drive 930, respectively. Shield disc drive 930 is connected to shield drive motor 932 at drive wheel 938.

Figure 11:
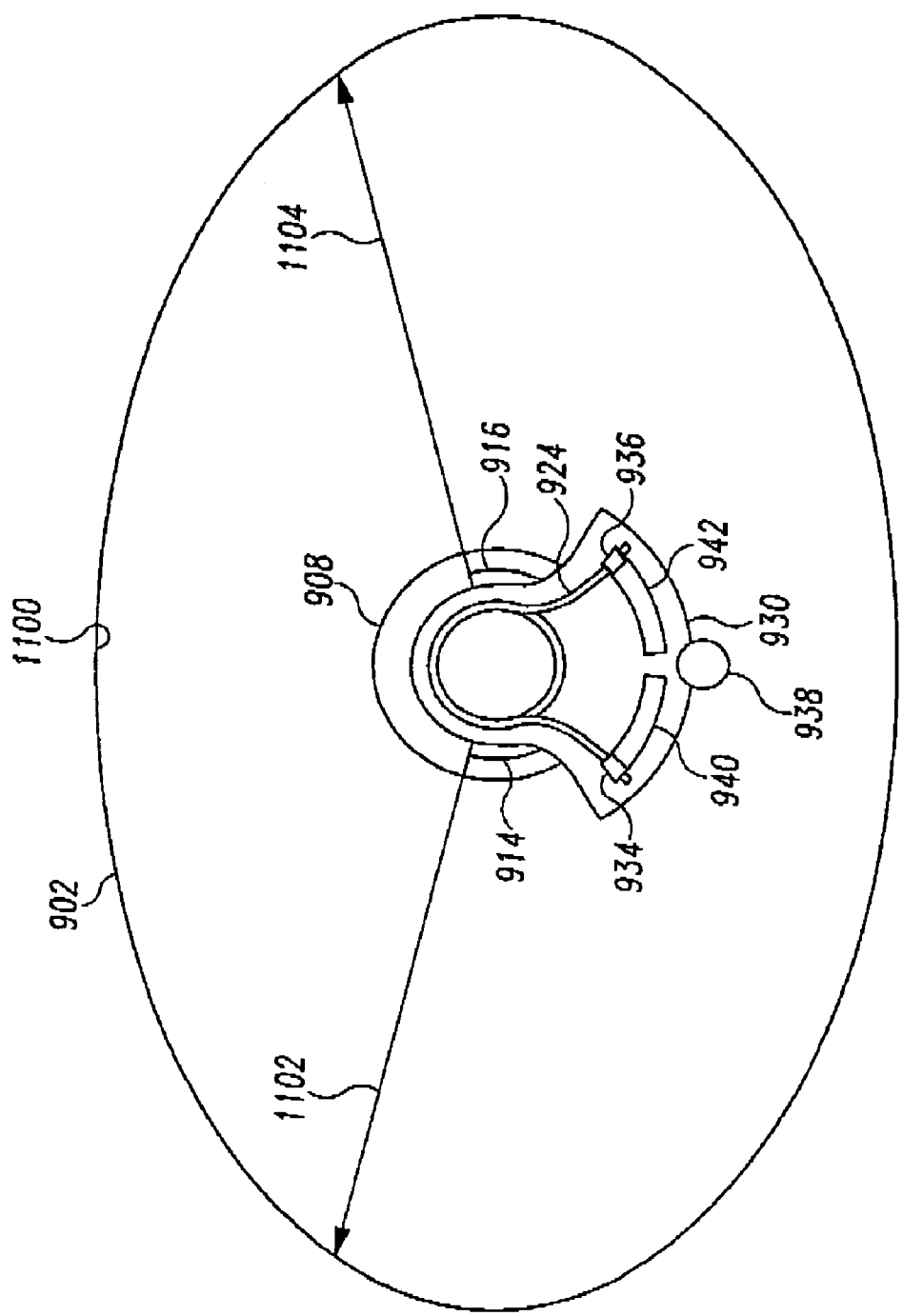
FIG. 11 is a partial cutaway front view of the headlamp assembly of FIG. 9 with a central portion of the reflector exposed to radiation.

Referring now to FIG. 11, a front partial cutaway view of the light assembly of FIG. 9 is shown. Shield disc drive 930 comprises slots 940 and slot 942. Shield pin 934 and shield pin 936 protrude through shield disc drive 930 at slots 940 and 942 respectively. Both shield pin 934 and shield pin 936 are biased by spring 924.

Figure 12:
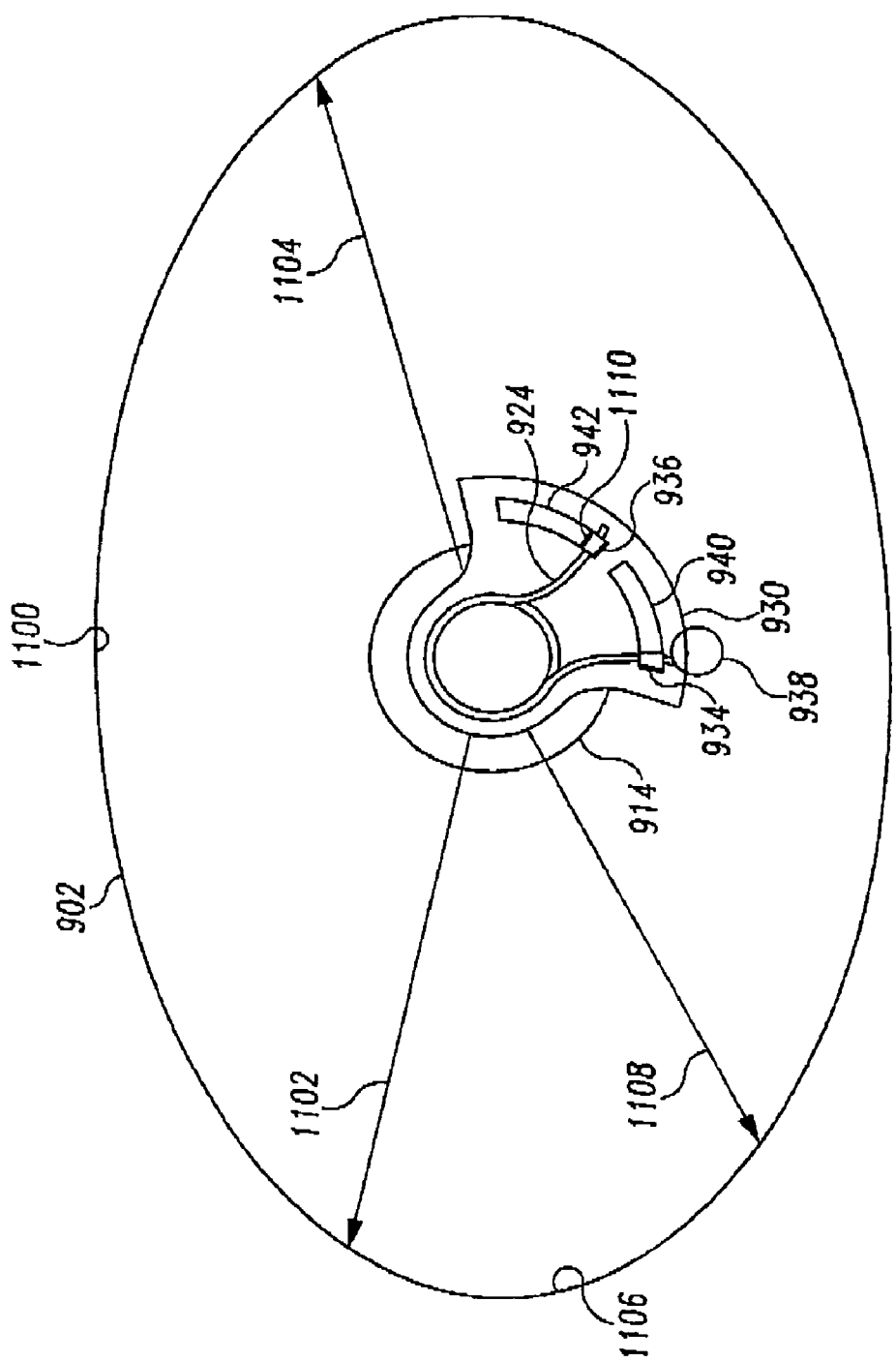
FIG. 12 is a partial cutaway front view of the headlamp assembly of FIG. 9 with additional areas of the reflector exposed to radiation.

Operation of this embodiment is similar to the operation of the embodiment of FIG. 1, and is briefly described with reference to FIGS. 11–12. Beginning at FIG. 11, shield disc drive 924 is shown in its neutral position. In this position, shields 914 and 916 provide a cutoff to light source 906 such that central portion 1100 of reflector 902 is illuminated between rays 1102 and 1104.

In response to a sensed condition, drive wheel 938 is rotated in a clockwise direction. This forces shield disc drive 930 to move upward and to the right. As shield disc drive 930 moves, the end of slot 940 forces shield pin 934 to the right, overcoming the resistance caused by spring 924. Spring 924 forces shield pin 936 to remain against mechanical stop 1110, as slot 942 moves past shield pin 936. Accordingly, shield 914 moves in a counterclockwise direction, exposing area 1106 of reflector 902 to light source 906. Area 1106 is defined by ray 1102 and ray 1108. As was the case with the embodiment of FIG. 1, the movement of shield disc 930 may be done in several incremental steps. Movement of shield 916 is effected in a similar, but converse, manner.

The present invention may be practiced in a variety of embodiments. For example, the prescription of the reflector (i.e. reflectors 192 and 902 of FIGS. 1–12) and/or lens 10 (shown in FIGS. 2 and 5–10) may be uniform, so that a given rotation of the shields results in a given degree of additional light. Alternatively, the prescriptions of the different zones of the reflector (i.e., central portion 106, zones 108 and 109, and edges 111 and 112 of reflector 102 of FIGS. 1–8) or different zones of the lens 10 (not pictured) may be selected so that an initial rotation results in a given degree of additional light, but a second rotation of equal magnitude results in more than the given degree of additional light. For example, the initial rotation may illuminate an additional 10 degrees, while a subsequent rotation illuminates 15 degrees, for a total of 25 degrees of illumination.

Additionally, the rotation of the shield need not be uniform. Thus, an initial rotation may be of 10 degrees, and a subsequent rotation of 15 degrees, for a total of 25 degrees of rotation. Alternatively, the shields may be rotated in some proportion, fixed or variable, to the sensed condition. This results in a significant number of intermediate positions between the neutral position of the shield and the fully rotated position.

Moreover, the beam emitted by the light assembly need not be of the type wherein the additional beam of light crosses over the beam of light emitted when the shields are in the neutral position.

Additionally, the invention may be incorporated into a number of different light assembly types. It may be incorporated in a sealed lamp assembly where the reflector surfaces of the housing are integral with the housing. It may be incorporated into a lamp assembly which has a separate internal aimable reflector. The proposed system can also include provision for manipulation in two planes. An additional actuator may be used and dedicated to adjusting the beam pattern in the second plane.

Accordingly, the present invention provides a bending lamp that allows for significant angular displacement of the light beam of a light assembly without excessive light beam distortion and without the need to move the entire light assembly. It further provides a system that is of inexpensive and dependable construction, while providing for increased scope of illumination as the severity of the turn is increased. It further provides a light assembly that is easily configured to fit within space confines of a variety of vehicle designs.

While the present invention has been described in detail with reference to certain exemplary embodiments thereof, such are offered by way of non-limiting example of the invention, as other versions are possible. Moreover, a number of design choices exist within the scope of the present invention, some of which have been discussed above. It is anticipated that a variety of other modifications and changes will be apparent to those having ordinary skill in the art and that such modifications and changes are intended to be encompassed within the spirit and scope of the invention as defined by the following claims.

I claim:

1. A light assembly comprising,
   a light source,
   a first shield and a second shield pivotally joined to one another and positioned opposite each other around the light source, the first shield having a first shield pin extending therefrom and a second shield having a second shield pin extending therefrom,
   a rotatable disk with a first slot and a second slot, the disk being connected to the first and second shield so that the first shield pin passes through the first slot and the second shield pin passes through the second slot; so that when the disk remains stationary the first and second shield occupies a first position that causes the light assembly to emit a first beam and so that when the disk is rotated, the disk changes the first and second shields between at least a second position that causes the light assembly to emit a first additional beam, and at least a third position that causes the light assembly to emit a second additional beam.

2. The light assembly of claim 1 wherein the disk is responsive to a first sensed condition such that the disk changes the first and second shields to the second position when the first condition is sensed.

3. The light assembly of claim 2 wherein the disk is further responsive to a second sensed condition such that the disk changes the first and second shields to the third position when the second condition is sensed.

4. The light assembly of claim 3, wherein the first sensed condition is a turn condition, and the second sensed condition is a turn condition more severe than the first sensed condition, such that as the turn condition becomes more severe, progressively more illumination is provided.

5. The lamp assembly of claim 1, wherein the the first and second shields are capable of being placed in a plurality of positions intermediate the first and the third positions and intermediate the first and the second positions.

6. The lamp assembly of claim 1, further comprising,
an actuator operatively connected to the disk, the actuator responsive to a sensed condition and capable of causing the disk to change the first and second shields from the first position to the second and third positions.

7. The light assembly of claim 1, further comprising a reflector having at least two different reflecting zones capable of being illuminated when the first and second shields occupy the first, second and third positions.

8. The lamp assembly of claim 7, wherein the at least two reflecting zones of the reflector comprise,
a first zone associated with the first position, such that when the first and second shields are in the first position, the first zone is in optical communication with the light source,
a second zone associated with the second position, such that when the first and second shields are in the second position, the second zone is in optical communication with the light source, and
a third zone associated with the third position, such that when the first and second shields are in the third position, the third zone is in optical communication with the light source.

9. The lamp assembly of claim 8, wherein the second zone and the third zone of the reflector have prescriptions, and the prescription of the second zone is different from the prescription of the third zone.

10. A light assembly comprising:
(a) a light source;
(b) a shield moveable between a first position wherein the light assembly is capable of emitting a first beam, a second position wherein the light assembly is capable of emitting a first additional beam, and a third position wherein the light assembly is capable of emitting a second additional beam; and
(c) a reflector having a first area, a second area, and a third area, the first area associated with the first position of the shield, the second area associated with the second position of the shield, and the third area associated with the third position of the shield, such that when the shield is in the first position, the first area is optically exposed to the light source, but the second and third areas are not and such that when the shield is in the second position, the first and second areas are optically exposed to the light source, but the third area is not, and when the shield is in the third position, the first, second and third areas are optically exposed to the light source.

11. The light assembly of claim 10, further comprising,
a lens, and wherein the distance between the first position and the second position, the distance between the second position and the third position, the lens and the reflector are designed such that when the light source is energized and the second area is optically exposed to the light source, a first additional area is illuminated, and when the light source is energized and the third area is optically exposed to the light source, a second additional area is illuminated, the second additional area larger than the first additional area.

12. The light assembly of claim 11 wherein the distance between the first position and the second position is the same as the distance between the second position and the third position.

13. The lamp assembly of claim 10, further comprising,
a spring operatively connected to the shield for biasing the shield toward the first position.

14. The light assembly of claim 10 wherein the shield comprises:
a first movable shield adjacent the light source and capable of being placed in a first, a second and a third position, and
a second movable shield adjacent the light source and generally opposite the first movable shield, capable of being placed in a first, a second and a third position.

15. The light assembly of claim 14, wherein the first movable shield and the second movable shield are movable about the same pivot axis.

16. The light assembly of claim 15, wherein the first movable shield is rotationally connected to the second movable shield.

17. The light assembly of claim 10, wherein the first and second movable shields are capable of being placed in a plurality of positions intermediate the first and the third positions.

18. The light assembly of claim 10, further comprising,
at least one actuator, the actuator responsive to a sensed condition and capable of moving the shield from the first position to the second and third position.

19. The light assembly of claim 18, further comprising,
a spring operatively connected to the shield for biasing the shield toward the first position.

20. A method of providing bending light comprising the steps of,
providing a light fixture with a light source, a first shield and second shield pivotally joined to one another and positioned around the light source and a rotatable disk joined to each of the first shield and second shield so that the first and second shields occupy a first position and can change from the first position to a second position and a third position,
sensing a first condition,
moving the disk so that the first shield and second shield change either from the first position to the second position or from the third position to the second position in response to the sensed first condition,
sensing a second condition, and
moving the disk so that the first and second shields change from either the second position to a third position or the first position to the third position in response to the sensed second condition.

21. The method of claim 20, wherein the first sensed condition is a turn condition and wherein the second sensed condition is a turn condition.

* * * * *